United States Patent [19]

Loontjens et al.

[11] Patent Number: 4,546,092

[45] Date of Patent: Oct. 8, 1985

[54] PROCESS OF PREPARING A SOLID CATALYTIC TITANIUM COMPONENT AND PROCESS FOR THE POLYMERIZATION OF 1-ALKENES USING SUCH A TITANIUM COMPONENT

[75] Inventors: Jacobus A. Loontjens, Meerssen; Bernardus J. Muskens, Geleen, both of Netherlands

[73] Assignee: Stamicarbon B.V., Licensing Subsidiary of DSM, Geleen, Netherlands

[21] Appl. No.: 525,825

[22] Filed: Aug. 23, 1983

Related U.S. Application Data

[63] Continuation-in-part of Ser. No. 486,002, Apr. 14, 1983, abandoned.

[30] Foreign Application Priority Data

Apr. 15, 1982 [NL] Netherlands ......................... 8201574
Apr. 13, 1983 [EP] European Pat. Off. ......... 83200525.0
Apr. 14, 1983 [CA] Canada .................................. 425825

[51] Int. Cl.$^4$ ............................................... C08F 4/64
[52] U.S. Cl. .................................... 502/105; 502/115; 502/121; 502/123; 502/124; 502/125; 502/126; 502/127; 526/125
[58] Field of Search ............... 502/105, 125, 115, 126, 502/127, 124, 121, 123

[56] References Cited

FOREIGN PATENT DOCUMENTS 33022 8/1981 European Pat. Off. .
2047255 11/1980 United Kingdom .

*Primary Examiner*—Patrick P. Garvin
*Attorney, Agent, or Firm*—Cushman, Darby & Cushman

[57] ABSTRACT

A process is disclosed for preparing a titanium catalyst component useful for homopolymerizing 1-alkenes and for copolymerizing 1-alkenes with each other and/or with ethylene, consisting essentially in grinding a titanium halide compound/electron-donor complex with a magnesium aluminum halide obtained by precipitation from an organic solvent.

In the process the ground product is first washed with a washing liquid containing a solvent for the aluminum halide/electron-donor complex which forms during the grinding process and by preference at least one alcohol, the molar ratio between alcohol and titanium in the ground product ranging between 50:1 and 1:20, and then the washed product is exposed to a liquid titanium halide compound.

With this procedure, it is possible to obtain a titanium component which imparts to the polymerization catalyst an excellent stereospecificity along with a very high activity, and with which it is possible to obtain polymers, e.g. polypropylene, with a very low halogen content, a very low titanium content, and an excellent powder morphology and bulk density.

25 Claims, No Drawings

PROCESS OF PREPARING A SOLID CATALYTIC TITANIUM COMPONENT AND PROCESS FOR THE POLYMERIZATION OF 1-ALKENES USING SUCH A TITANIUM COMPONENT

This application is a continuation-in-part of application Ser. No. 486,002, filed Apr. 14, 1983, and now abandoned.

This invention relates generally to a process for preparing a solid titanium-containing catalyst component useful for homo-polymerizing 1-alkenes and for co-polymerizing 1-alkenes with each other and/or with ethylene, by complexing a titanium halide compound with an electron donor compound and combining, by grinding, the complex with a magnesium aluminum halide. The invention further relates to a process for homo-polymerizing 1-alkenes and for copolymerizing 1-alkenes with each other and/or with ethylene using such a titanium catalyst component.

The expression "magnesium aluminum halide" is used here to mean a combination of a magnesium halide and an aluminum halide as an intimate mixture, a co-crystalline compound, a complex, a solid solution or the like. The magnesium aluminum halide may, in addition, contain other components.

A process as generally described above is known from U.K. Patent Publication No. 2,047,255. According to European Patent Publication No. 33,022 A 1, in order to lower the halogen content and the titanium content of the polymer obtained using the catalyst, the product obtained by grinding the titanium complex with the magnesium aluminum halide is suspended in an inert organic dispersant containing a dissolved organic aluminum compound. The solid which results is separated out and used as a finished titanium catalyst component.

It has now been discovered that, specifically in the case of alkene polymerization catalysts formed by grinding a titanium halide compound complexed by an electron donor compound with a magnesium aluminum halide obtained by precipitation, catalytic activity and stereospecificity can be considerably improved by washing the ground product with a washing liquid containing one or a mixture of certain solvents in which the complex of the aluminum halide concerned and the electron donor concerned is at least partially soluble and by preference at least one alcohol, e.g. an aromatic alcohol, preferably an unsubstituted phenol or a phenol substituted with one or more halogen groups and/or with one or more alkyl and/or alkoxy groups with for instance 1-6 carbon atoms per group, for instance the cresols, the methoxy phenols, the xylenols, the ethyl phenols, the propyl phenols, the octyl phenols, the dibutyl phenols, the cumyl phenols or the naphthols, o-cresol being the most preferred, the molar ratio between alcohol and titanium in the ground product ranging between about 50:1 and 1:20, preferably between about 20:1 and 1:10, and treating the washed product with a liquid titanium halide compound.

Although the invention is not restricted by any theoretical consideration, it is believed that during the act of grinding a reaction occurs between the aluminum halide and the titanium halide compound/electron donor complex whereby the electron donor is at least partly detached from the titanium halide compound and forms a complex with the aluminum halide. The solvent washing step removes aluminum halide/electron donor complex so formed. Next, titanium halide is taken up on sites vacated by the washed-out complex.

According to the invention a solid titanium catalyst component for the polymerization of 1-alkenes and for the copolymerization of 1-alkenes with each other and/or with ethylene is prepared by a process comprising:

A. forming a complex by exposing a titanium halide compound to an electron donor compound;

B. forming a magnesium aluminum halide by precipitation from an organic solvent;

C. forming a ground product by grinding said complex with said magnesium aluminum halide;

D. washing said ground product with a washing liquid containing a solvent which removes aluminum halide and electron donor and by preference at least one alcohol; and E. exposing said washed product to a liquid titanium halide compound to form a finished titanium catalyst component.

The titanium halide compound/electron donor complex may be obtained in any known manner, for instance by bringing the components of the complex in contact with each other. A suitable method for preparing the said complex is adding to a solution of the titanium halide compound in question the electron donor in question, forming a precipitate of the said complex and separating off the titanium halide compound/electron donor complex.

The titanium component of this invention has a very high stereospecificity, is highly active and gives exellent powder morphology and bulk density. With this catalyst it is possible to obtain polymers, for example polypropylene, having a very low halogen content and a very low titanium content, such that a washing step following polymerization can be dispensed with. Moreover, the polymer exhibits a good particle size. Due to these desirable properties, the polymer is not only readily processable but also relatively non-corrosive to processing equipment.

The term "titanium halide compound" as used in "titanium halide compound/electron donor complex" includes not only compounds derived wholly from titanium and halogen, but also compounds wherein a portion of titanium valences are used to form bonds to moieties other than halogen. The halogen moiety is preferably chloride, but may also be, for example, bromide and/or iodide. Advantageously, the titanium halide compound is derived from tetravalent titanium. Examples are $TiCl_4$, $TiBr_4$, $TiI_4$ and $Ti(isobutoxy)_2Cl_2$. Particularly suitable is $TiCl_4$. For use in multi-stage polymerizations, particularly those normally requiring more than half an hour for polymerization in the first stage before a second stage is started, titanium halide phenolates have particular advantages. For the sake of brevity, the aforementioned U.K. Patent Publication No. 2,047,255 is referenced for further details concerning titanium halide compounds which can be used.

Suitable electron donors for use in making the titanium complex are, for example, oxygen-containing electron donors such as aliphatic alcohols, aromatic alcohols e.g. phenols, ketones, aldehydes, carboxylic acids, acid halides, esters, ethers and acid amides, phosphorus-containing electron donors such as phosphines, phosphites and phosphates, and nitrogen-containing electron donors such as amines, nitriles, isocyanates and nitro compounds. For specific examples, U.K. Patent Publication No. 2,047,255 is again referenced. Ethers having 2-20 carbon atoms such as dimethylether, diethyl ether, di-n-butyl ether, di-isoamyl ether, tetrahydrofuran, anisole or diphenyl ether, and organic esters having 2–40, and in particular 2–18 carbon atoms per molecule are especially favorable. The acid component of the ester normally contains 1–9 carbon atoms or is a natural fatty acid. The alcohol component of the ester normally contains 1–6 carbon atoms.

Examples of suitable esters are methyl formate, cyclohexyl formate, ethyl acetate, vinyl acetate, amyl acetate, 2-ethylhexyl acetate, cyclohexyl acetate, ethyl propionate, amyl propionate, methyl butyrate, ethyl valerate, methyl chloroacetate, ethyl dichloroacetate, methyl methacrylate, ethyl acrylate, n-butyl acrylate, ethyl crotonate, dimethyl maleate, ethyl cyclohexane carboxylate, methyl benzoate, ethyl benzoate, isobutyl benzoate, octyl benzoate, cyclohexyl benzoate, phenyl benzoate, benzyl benzoate, phenyl ethyl benzoate, methyl toluate, ethyl toluate, isoamyl toluate, methyl anisate, ethyl anisate, γ-butyrolactone, ε-caprolactone, coumarin, phtalide and ethylene carbonate. Particularly preferred are esters derived from aromatic acids, especially esters of benzoic acid optionally substituted with alkyl or alkoxy groups. Alkyl esters having 1–4 carbon atoms in the alcohol moiety, particularly methyl or ethyl esters of benzoic acid, o- or p-toluene carboxylic acid or p-methoxy benzoic acid are especially favorable.

The magnesium aluminum halide is obtained by precipitation from an organic solvent and should be virtually water-free and, preferably, also virtually magnesium oxide-free.

The expressions "virtually water-free" and "virtually magnasium oxide-free" mean that the concentrations of water and magnesium oxide, respectively, in the magnesium aluminum halide support material are insignificant. Specifically, water should not be present in an amount greater than 0.2 percent, and preferably not more than 0.1 percent, by weight of the support material. Magnesium oxide should not be present in an amount greater than 0.1, and preferably not greater than 0.01 mgeq, calculated as mgeq of base titratable with dilute strong acid such as 0.1N hydrochloric acid, per gram of support material.

The magnesium aluminum halide may in addition contain minor amounts of other metal ions, e.g. sodium, tin, silicon or germanium. The magnesium:aluminum weight ratio is preferably from about 1:3 to about 100:1, and advantageously is between about 1:1 and 20:1. The halide is preferably chloride, but may also be, for example, bromide or iodide or a mixture thereof.

According to a preferred embodiment of the invention, the magnesium aluminum halide is obtained by precipitation from a solution containing an organic aluminum compound and an organic magnesium compound by using a precipitating halogenating agent having the formula $RX_m$, wherein R denotes a hydrocarbon, a hydrogen atom or a halogen atom, X denotes a halogen atom, and m is an integer from 1 to 10. The compound $RX_m$ may be, for example, a hydrogen halide e.g. in the form of the water-free gas or an aliphatic halogen containing compound e.g. having 1–8 carbon atoms per molecule. Hydrogen halides and alkyl halides are preferred. Exemplary as alkyl halides are methyl chloride, methylene chloride, chloroform, ethyl bromide, ethylene dichloride, isopropyl chloride, n-butyl iodide and the like. Free halogens and interhalogen compounds such as $Cl_2$, $Br_2$, $I_2$, $ICl$, $ICl_3$ and $BrCl$ may also be employed.

The organic aluminum compound preferably contains one or more hydrocarbon groups bonded directly to the metal. The hydrocarbon groups preferably contain 1 to 10 carbon atoms. Examples are trialkyl or trialkenyl aluminum compounds such as triethyl aluminum, tripropyl aluminum, triisobutyl aluminum, triisoprenyl aluminum, trihexyl aluminum and trioctyl aluminum; dialkyl aluminum hydrides such as diethyl aluminum hydride or diisobutyl aluminum hydride; dialkyl aluminum halides, in particular a chloride and bromide, diethyl aluminum chloride and diethyl aluminum bromide being particularly suitable, but wherein di-n-butyl aluminum chloride or methyl-n-butyl aluminum chloride, for example, may also be employed. Further, monoalkyl aluminum dihalides such as ethyl aluminum dichloride, n-butyl aluminum dichloride or n-hexyl aluminum dibromide are also suitable. If a halogen-containing organic aluminum compound is used, the halogen preferably corresponds to that used in the halogenating agent. Trialkyl aluminum compounds are preferred.

The organic magnesium compound may be, for example, a dialkyl magnesium or an alkyl magnesium halide. The hydrocarbon groups again preferably contain 1 to 10 carbon atoms. Examples are ethyl magnesium chloride, n-butyl magnesium chloride, isopropyl magnesium bromide, n-decyl magnesium iodide, ethyl-n-butyl magnesium, di-n-butyl magnesium, di-isoamyl magnesium and di-n-octyl magnesium.

The conversion of the organometallic aluminum and magnesium compounds to the magnesium aluminum halide is effected by precipitation of the magnesium aluminum halide from a solution of the organometallic compounds in a suitable solvent. Examples of suitable solvents are aliphatic, cycloaliphatic, aromatic and mixed aromatic/aliphatic hydrocarbons having 3–8 carbon atoms per molecule, such as butane, isobutane, n-hexane, n-heptane, cyclohexane, benzene, toluene and the xylenes. The solvent is preferably inert under the reaction conditions employed.

Further details concerning this preferred embodiment are described in U.K. Patent Publication No. 2,047,255. Using this preferred embodiment, a significant improvement in catalytic activity can be achieved, along with a high stereospecificity.

According to a very suitable method the complexed titanium halide compound and the magnesium aluminum halide prepared as described above are then mixed and the mixture is ground in a ball mill for a period between about 5 hours and about 50 hours. The term "ground product" is used hereinafter to describe the product resulting from the grinding process. The ground product is then washed with a washing liquid containing a suitable solvent as indicated above and treated with a liquid titanium halide compound to form the finished catalyst component.

The titanium content in the ground product and also in the finished catalyst component is usually between 0.1 and 10 percent by weight. The titanium:magnesium:aluminum weight ratio in the ground product may be about 1:(0.5–20):(0.1–5), and advantageously is about 1:(0.5–2.5):(0.2–1). The electron donor is present in the titanium component in an amount of, for example 0.1 to 5 molecules per titanium atom. A typical example of the various contents in the finished titanium catalyst, although these vary depending on the conditions for the catalyst preparation, is 1–10 percent by weight of titanium, 16–25 percent by weight of magnesium, 0.05–2.0 percent by weight of aluminum, 45–65 percent by weight of halogen and 5–25 percent by weight of the electron donor.

As mentioned above, the ground product is washed with a washing liquid containing a suitable solvent for the complex formed by the aluminum halide and the electron donor compound during the grinding process and by preference at least one aromatic alcohol.

Example of solvents preferred for this washing step are liquid (at the temperature and pressure employed) aliphatic, cycloaliphatic, aromatic and mixed aromatic-/aliphatic hydrocarbons having 4–12 carbon atoms per molecule, such as butane, isobutane, n-hexane, n-heptane, cyclohexane, tetralin, decalin, benzene, toluene and the xylenes. Halogenated hydrocarbons such as $CCl_4$ or $C_2Cl_6$ can also be used. If desired, the solvent may contain harmless i.e. non-reactive additives.

Examples of the alcohols preferably used are unsubstitued phenol or a phenol substituted with or more halogen groups and/or with on or more alkyl or alkoxy groups with for instance 1–6 carbon atoms per group, for instance the cresols, the methoxy phenols, the xylenols, the ethyl phenols, the propyl phenols, the octyl phenols, the dibutyl phenols, the cumyl phenols or the naphthols. O-cresol is the most preferred.

The washing treatment is carried out at a temperature e.g. between about 250° and about 425° K., and preferably between about 330° and about 380° K. The pressure is not critical and may be between about 10 and about 1000 kPa. The amount of washing liquid used is e.g. between about 1 and about 1000, preferably between about 5 and 100 grams per gram of ground product. The washing conditions are such that a substantial quantity of the aluminum halide/electron-donor complex is removed from the ground product. Under these conditions, some titanium may also disappear from the ground product. The weight ratio between solvent and alcohol in the washing liquid is preferably between about 2:1 and 2000:1, more particularly between about 5:1 and 200:1.

The washed product is then treated with a liquid titanium halide compound. The liquid titanium halide compound may be an undiluted titanium halide compound which is liquid per se, or a liquid solution of a titanium halide compound in a suitable solvent. Compounds of tetravalent titanium are the most suitable. For examples of suitable titanium halide compounds, the same titanium compounds used to make the titanium halide compound/electron-donor complex may be employed. Here too, $TiCl_4$ is particularly suitable. If a solution of titanium compound is employed the same solvents may be used as those mentioned above for washing the ground product.

The treatment with the liquid titanium halide compound is effected at a temperature e.g. between about 250° and about 450° K., preferably between about 320° and about 420° K. The pressure is not critical and may be between about 10 and about 1000 kPa. The amount of liquid titanium halide compound, expressed as the number of mmoles of Ti per gram of washed product, is e.g. between about 1 and 1000 mmmoles/gram, preferably between about 5 and about 500 mmoles/gram. Amounts larger than 1 mole per gram may be used but offer no advantage.

After this treatment, the titanium catalyst is preferably after-washed with a second washing liquid. As second washing liquid the same solvents are suitable as the ones already mentioned for use in the washing liquid for the ground product. As second washing liquid also mixtures of these solvents or of these solvents with the alcohols mentioned above may be used.

To carry out the homo-polymerization of 1-alkenes or the copolymerization of one or more 1-alkenes with each other and/or with ethylene, the finished catalyst component is used in combination with an organometallic component derived from a metal from groups I–III of the Periodic Table having hydrocarbon groups bonded directly to the metal. Examples are trialkyl aluminum compounds, alkyl aluminum alkoxides, alkyl aluminum hydrides, alkyl aluminum halides, dialkyl zinc compounds and dialkyl magnesium compounds. Among these, the organoaluminum compounds are particularly suitable. Examples of organoaluminum compounds are trialkyl and trialkenyl aluminum compounds such as triethyl aluminum, tripropyl aluminum, triisobutyl aluminum, triisoprenyl aluminum, trihexyl aluminum and trioctyl aluminum; alkyl aluminum compounds in which two or more aluminum atoms are interconnected by means of an oxygen or nitrogen atom such as $(C_2H_5)_2AlOAl(C_2H_5)_2$, $(iso-C_4H_9)_2AlOAl(iso-C_4H_9)_2$ or $(C_2H_5)_2AlNHAl(C_2H_5)_2$; dialkyl aluminum hydrides such as diethyl aluminum hydride or diisobutyl aluminum hydride; dialkyl aluminum halides, in particular a chloride or bromide, diethyl aluminum chloride and diethyl aluminum bromide being particularly suitable, but wherein other dialkyl aluminum halides having preferably 1 to 10 carbon atoms in the alkyl group such as di-n-butyl aluminum chloride and methyl-n-butyl aluminum chloride are also suitable; and dialkyl aluminum alkoxides or dialkyl aluminum phenoxides, e.g. diethyl ethoxy aluminum or diethyl phenoxy aluminum. The trialkyl aluminum compounds are most preferred.

Additionally, the organometallic component may contain a trialkyl aluminum compound as well as a dialkyl aluminum halide, or a mixture of a dialkyl magnesium compound and a monoalkyl aluminum dihalide. The alkyl groups of the metal alkyl compounds preferably contain 1–10 carbon atoms each or are a palmityl or stearyl group.

The organometallic component preferably comprises a complex of an organometallic compound, in particular a trialkyl aluminum compound, and an ester of an oxygen-containing organic acid. As ester, the same esters may be used which are employed as electron donor to make the titanium halide compound/electron donor complex, particularly the esters of aromatic carboxylic acids. Advantageously, a portion of the organometallic compound, e.g. 50–90 %, is present in non-complexed state.

The Al:Ti atomic ratio of finished catalyst component plus organoaluminum component is normally between 10 and 1000; the molecular/atomic ratio of total bound Lewis base in the catalyst to Ti is normally between 1 and 200.

The catalyst provided according to this invention finds application especially in the stereospecific polymerization of 1-alkene monomers having at least 3 carbon atoms, e.g. up to 6 carbon atoms, per molecule, such as propylene, 1-butylene, 4-methyl-1-pentene and 1-hexene, and in the copolymerization of these 1-alkenes with each other and/or with ethylene. Copolymers with a random distribution of the various monomers and block copolymers can be prepared. If ethylene is used as comonomer, it is generally included in the monomer mixture in minor amounts not exceeding 30, and preferably between about 1 and about 15 percent by weight. The process according to the invention is especially useful for the preparation of isotactic polypropylene, random copolymers of polypropylene with minor quantities of ethylene and block copolymers of propylene and ethylene. For the preparation of block copolymers, any desired order of monomer addition may be employed.

The conditions under which the polymerization reaction with the catalyst titanium component is carried out do not differ from those known in the art. The reaction may be carried out in the gas phase or in the presence of a dispersant. The dispersant may be inert or a monomer in a liquid form. Examples of suitable dispersants are aliphatic hydrocarbons having 3–8 carbon atoms per molecule such as propylene, 1-butylene, butane, isobutane, n-hexane, n-heptane, cyclohexane, benzene, toluene and the xylenes.

If the polymerization is conducted in the liquid phase, the concentration of the titanium catalyst is preferably about 0.001–0.5 mmoles, calculated as titanium atoms, and the concentration of the organometallic component about 0.1–50 mmoles, both per liter of liquid phase.

The titanium catalyst component and the organometallic component can be introduced in the polymerization reactor both together and separately.

The polymerization temperature is generally between about 190° and about 475° K., and preferably about 310° and about 375° K. The pressure may be between about 100 and about 3000 kPa.

If desired, the molecular weight of the polymer may be regulated during the polymerization, for example by carrying out the polymerization in the presence of hydrogen or another known molecular weight regulator.

The polymerization reaction may be carried out batchwise as well as continuously.

The invention is explained by the following non-restricting examples and comparative experiment.

EXAMPLE I

A.1 Catalyst Preparation 6.5 ml of water-free ethyl benzoate (EB), dissolved in 75 ml water-free gasoline, is added dropwise to a solution of 5 ml $TiCl_4$ in 125 ml gasoline at 273° K. A precipitate of the complex $TiCl_4.EB$ is formed, isolated by filtration, washed with dry gasoline and dried.

100 ml of a gasoline solution containing 0.3 moles of dibutyl magnesium and 0.1 moles of triethyl aluminum per liter is introduced into a nitrogenpurged three-neck flask provided with a mechanical stirrer and a reflux condenser. As a stream of dry HCl gas is passed in, a yellowish precipitate is formed. The precipitate is isolated by filtration, washed with dry gasoline and dried.

The composition of the product (magnesium aluminum chloride) is 18.4 percent by weight of Mg, 5.5 percent by weight of Al, 70.0 percent by weight of Cl and 6.1 percent by weight of organic material.

2.8 grams of the magnesium aluminum chloride so-obtained and 2.3 grams of $TiCl_4.EB$, in that order, are introduced into a stainless steel ball mill with a capacity of 0.8 liters. This mixture is ground for 18 hours.

A.2 Washing and Treatment of Ground Product To Form the Finished Catalyst Component About 1 gram of the ground product from IA.1 is suspended in 20 ml of water-free gasoline. The temperature is raised to 333° K. and maintained at this value for 2 hours. The suspension is then filtered and the solid matter washed with water-free gasoline at 333° K.

The washed product is then suspended in 10 grams of $TiCl_4$. After the solid matter has been in contact with $TiCl_4$ for 2 hours at 333° K., the suspension is filtered and washed with gasoline at 333° K. Finally, the finished titanium catalyst component thus obtained is dried.

B. Polymerization 2.5 liters of gasoline are supplied to a stainless steel reactor purged with nitrogen and provided with a mechanical stirrer. Separately, 6.25 mmoles of triethyl aluminum, 1.25 mmoles of methyl-p-toluate and 0.15 grams of the finished titanium catalyst component obtained according to IA.2 are mixed together for 5 minutes in 50 milliliters of gasoline. After this suspension has been fed to the reactor, hydrogen and propylene are fed in to partial pressure of 50 and 650 kPa respectively. The temperature of the reactor is raised to 333° K. and maintained at that value. After a period of polymerization of 2 hours the polymer is isolated by centrifugation.

The polymerization activity is 7010 grams of polypropylene per gram of titanium catalyst, the soluble polymer content is 4.0% by weight, the bulk density is 0.38 grams per milliliter, the particle size distribution parameter $n_{RRS}$ is 1.2 and the $d_{50}$ is 700 μm. The $n_{RRS}$ is determined according to Rosin and Rammler as described in EP Patent Specification 2861, the contents of which is hereby incorporated in this text. The $d_{50}$ is determined by using the Rosin-Rammler diagram with $R=50$.

EXAMPLE II

A.1 Catalyst Preparation 6.5 ml of water-free ethyl benzoate (EB), dissolved in 75 ml water-free gasoline, is added dropwise to a solution of 5 ml $TiCl_4$ in 125 ml gasoline at 273° K. A precipitate of the complex $TiCl_4.EB$ is formed, isolated by filtration, washed with dry gasoline and dried.

100 ml of a gasoline solution containing 0.37 moles of ethylbutyl magnesium and 0.11 moles of triethyl aluminum per liter is introduced into a nitrogenpurged three-neck flask provided with a mechanical stirrer and a reflux condenser. As a stream of dry HCl gas is passed in, a yellowish precipitate is formed. The precipitate is isolated by filtration, washed with dry gasoline and dried.

The composition of the product (magnesium aluminum chloride) is 18.6 percent by weight of Mg, 5.4 percent by weight of Al, 68.2 percent by weight of Cl and 7.8 percent by weight of organic material.

2.8 grams of the magnesium aluminum chloride so-obtained and 2.3 grams of $TiCl_4.EB$, in that order, are introduced into a stainless steel ball mill with a capacity of 0.8 liters. This mixture is ground for 18 hours.

A.2 Washing and Treatment of Ground Product To Form the Finished Catalyst Component About 1 gram of the ground product from IIA.1 is suspended in 25 ml of water-free gasoline. The suspension is stirred during 2 hours at 293° K. The suspension is then filtered and the solid matter washed with water-free gasoline at 293° K.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization 2.3 liters of gasoline are supplied to a stainless steel reactor purged with nitrogen and provided with a mechanical stirrer. Separately, 6.70 mmoles of triethyl aluminum, 1.35 mmoles of methyl-p-toluate and 0.19 grams of the finished titanium catalyst component obtained according to IIA.2 are mixed together for 5 minutes in 50 milliliters of gasoline. After this suspension has been fed to the reactor, hydrogen and propylene are fed in to partial pressure of 50 and 650 kPa respectively. The temperature of the reactor is raised to 333° K. and maintained at that value. After a period of polymerization of 2 hours the polymer is isolated by centrifugation.

The polymerization activity is 7430 grams of polypropylene per gram of titanium catalyst, the soluble polymer content is 5.3% by weight and the bulk density is 0.39 grams per milliliter.

EXAMPLE III

A.2 Washing and Treatment of Ground Product To Form the Finished Catalyst Component About 1 gram of the ground product from IIA.1 is suspended in 25 ml of water-free gasoline. The suspension is refluxed during 2 hours at 333° K. The suspension is then filtered and the solid matter washed with water-free gasoline at 333° K.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization

The polymerization is carried out as described in IIB, except that now 0.19 grams of the finished titanium catalyst obtained according to IIIA.2 are used.

The polymerization activity is 8625 grams of polypropylene per gram of titanium catalyst, the soluble polymer content is 4.5% by weight and the bulk density is 0.40 grams per milliliter.

EXAMPLE IV

A.2. Washing and Treatment of Ground Product To Form the Finished Catalyst Component About 1 gram of the ground product from IIA.1 is suspended in 25 ml of a mixture of water-free gasoline and diiso amyl ether, containing such a quantity of diiso amyl ether that the suspension formed contains 2 moles of diiso amyl ether per gramatom aluminum. The suspension is refluxed during 2 hours at 333° K. The suspension is then filtered and the solid matter washed with water-free gasoline at 333° K.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization

The polymerization is carried out as described in IIB, except that now 0.19 grams of the finished titanium catalyst obtained according to IVA.2 are used.

The polymerization activity is 7630 grams of polypropylene per gram of titanium catalyst, the soluble polymer content is 4.4% by weight and the bulk density is 0.40 grams per milliliter.

EXAMPLE V

A.2. Washing and Treatment of Ground Product To Form the Finished Catalyst Component About 1 gram of the ground product from IIA.1 is suspended in 25 ml of heptane. The suspension is refluxed during 2 hours at 373° K. The suspension is then filtered and the solid matter washed with heptane at 333° K.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization

The polymerization is carried out as described in IIB, except that now 0.19 grams of the finished titanium catalyst obtained according to VA.2 are used.

The polymerization activity is 7300 grams of polypropylene per gram of titanium catalyst, the soluble polymer content is 4.1% by weight and the bulk density is 0.38 grams per milliliter.

EXAMPLE VI

A.2. Washing and Treatment of Ground Product To Form the Finished Catalyst Component About 1 gram of the ground product from IIA.1 is suspended in 25 ml of toluene. The suspension is refluxed during 2 hours at 383° K. The suspension is then filtered and the solid matter washed with toluene at 333° K.

The washed product is then suspended in 40 grams of $TiCl_4$. After the solid matter has been in contact with $TiCl_4$ for 2 hours at 358° K., the suspension is filtered and washed with gasoline at 333° K. Finally, the finished titanium catalyst component thus obtained is dried.

B. Polymerization

The polymerization is carried out as described in IIB, except that now 0.19 grams of the finished titanium catalyst obtained according to VIA.2 are used.

The polymerization activity is 7635 grams of polypropylene per gram of titanium catalyst, the soluble polymer content is 3.5% by weight and the bulk density is 0.38 grams per milliliter.

EXAMPLE VII

A.2. Washing and Treatment of Ground Product To Form the Finished Catalyst Component About 1 gram of the ground product from IIA.1 is suspended in 25 ml of iso-octane. The suspension is refluxed during 2 hours at 391° K. The suspension is then filtered and the solid matter washed with iso-octane at 333° K.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization

The polymerization is carried out as described in IIB, except that now 0.19 grams of the finished titanium catalyst obtained according to VIIA.2 are used.

The polymerization activity is 5560 grams of polypropylene per gram of titanium catalyst, the soluble polymer content is 4.3% by weight and the bulk density is 0.40 grams per milliliter.

EXAMPLE VIII

A.1 Catalyst Preparation 6.5 ml of water-free ethyl benzoate (EB), dissolved in 75 ml water-free gasoline, is added dropwise to a solution of 5 ml TiCl$_4$ in 125 ml gasoline at 273° K. A precipitate of the complex TiCl$_4$.EB is formed, isolated by filtration, washed with dry gasoline and dried.

100 ml of a gasoline solution containing 0.37 moles of ethylbutyl magnesium and 0.11 moles of triethyl aluminum per liter is introduced into a nitrogenpurged three-neck flask provided with a mechanical stirrer and a reflux condenser. As a stream of dry HCl gas is passed in, a yellowish precipitate is formed. The precipitate is isolated by filtration, washed with dry gasoline and dried.

The composition of the product (magnesium aluminum chloride) is 18.6 percent by weight of Mg, 5.4 percent by weight of Al, 68.2 percent by weight of Cl and 7.8 percent by weight of organic material.

2.5 grams of the magnesium aluminum chloride so-obtained and 3.1 grams of TiCl$_4$.EB, in that order, are introduced into a stainless steel ball mill with a capacity of 0.8 liters. This mixture is ground for 18 hours.

A.2 Washing and Treatment of Ground Product To Form the Finished Catalyst Component About 1 gram of the ground product from VIIIA.1 is suspended in 25 ml of water-free gasoline. The suspension is refluxed during 2 hours at 333° K. The suspension is then filtered and the solid matter washed with water-free gasoline at 333° K.

The washed product is then suspended in 40 grams of TiCl$_4$. After the solid matter has been in contact with TiCl$_4$ for 2 hours at 353° K., the suspension is filtered and washed with gasoline at 333° K. Finally, the finished titanium catalyst component thus obtained is dried.

B. Polymerization

The polymerization is carried out as described in IIB, except that now 0.19 grams of the finished titanium catalyst obtained according to VIIIA.2 are used.

The polymerization activity is 7530 grams of polypropylene per gram of titanium catalyst, the soluble polymer content is 3.2% by weight and the bulk density is 0.41 grams per milliliter.

EXAMPLE IX

A.1 Catalyst Preparation 6.5 ml of water-free ethyl benzoate (EB), dissolved in 75 ml water-free gasoline, is added dropwise to a solution of 5 ml TiCl$_4$ in 125 ml gasoline at 273° K. A precipitate of the complex TiCl$_4$.EB is formed, isolated by filtration, washed with dry gasoline and dried.

100 ml of a gasoline solution containing 0.37 moles of ethylbutyl magnesium and 0.1 moles of triethyl aluminum per liter is introduced into a nitrogenpurged three-neck flask provided with a mechanical stirrer and a reflux condenser. As a stream of dry HCl gas is passed in, a yellowish precipitate is formed. The precipitate is isolated by filtration, washed with dry gasoline and dried.

The composition of the product (magnesium aluminum chloride) is 18.6 percent by weight of Mg, 5.4 percent by weight of Al, 68.2 percent by weight of Cl and 7.8 percent by weight of organic material.

1.6 grams of the magnesium aluminum chloride so-obtained and 4.0 grams of TiCl$_4$.EB, in that order, are introduced into a stainless steel ball mill with a capacity of 0.8 liters. This mixture is ground for 18 hours.

A.2 Washing and Treatment of Ground Product To Form the Finished Catalyst Component About 1 gram of the ground product from A.1 is suspended in 25 ml of water-free gasoline. The suspension is refluxed during 2 hours at 333° K. The suspension is then filtered and the solid matter washed with water-free gasoline at 333° K.

The washed product is then suspended in 40 grams of TiCl$_4$. After the solid matter has been in contact with TiCl$_4$ for 2 hours at 353° K., the suspension is filtered and washed with gasoline at 333° K. Finally, the finished titanium catalyst component thus obtained is dried.

B. Polymerization

The polymerization is carried out as described in IIB, except that now 0.19 grams of the finished titanium catalyst obtained according to IXA.2 are used.

The polymerization activity is 7270 grams of polypropylene per gram of titanium catalyst, the soluble polymer content is 4.1% by weight and the bulk density is 0.38 grams per milliliter.

EXAMPLE X

B. Polymerization 2.3 liters of gasoline are supplied to a stainless steel reactor purged with nitrogen and provided with a mechanical stirrer. Separately, 2.00 mmoles of triethyl aluminum, 0.50 mmoles of diethyl aluminum chloride, 0.50 mmoles of methyl-p-toluate and 0.10 grams of the finished titanium catalyst component obtained according to VIIIA.2 are mixed together for 5 minutes in 50 milliliters of gasoline. After this suspension has been fed to the reactor, purified propylene is fed in to partial pressure of 650 kPa. The temperature of the reactor is raised to 333° K. and maintained at that value. After a period of polymerization of 2 hours the polymer is isolated by centrifugation.

The polymerisation activity is 11080 grams of polypropylene per gram of titanium catalyst, the soluble polymer content is 5.1% by weight, the bulk density is 0.39 grams per milliliter, the n$_{RRS}$ is 1.3 and the d$_{50}$ is 700 μm.

EXAMPLE XI

B. Polymerization

The polymerization is carried out as described in XB, except that now 0.63 mmoles instead of 0.50 mmoles of methyl-p-toluate are used.

The polymerization activity is 9600 grams of polypropylene per gram of titanium catalyst, the soluble polymer content is 2.6% by weight and the bulk density is 0.40 grams per milliliter.

EXAMPLE XII

B. Polymerization

The polymerization is carried out as described in XB, except that now 0.83 mmoles instead of 0.50 mmoles of methyl-p-toluate are used.

The polymerization activity is 6070 grams of polypropylene per gram of titanium catalyst, the soluble polymer content is 1.3% by weight and the bulk density is 0.38 grams per milliliter.

EXAMPLE XIII

B. Polymerization

The polymerization is carried out as described in XB, except that now 0.10 grams of the finished titanium catalyst obtained according to IIIA.2 are used.

The polymerization activity is 9510 grams of polypropylene per gram of titanium catalyst, the soluble polymer content is 4.6% by weight and the bulk density is 0.39 grams per milliliter.

EXAMPLE XIV

B. Polymerization

The polymerization is carried out as described in XB, except that now 0.10 grams of the finished titanium catalyst obtained according to IXA.2 are used.

The polymerization activity is 9700 grams of polypropylene per gram of titanium catalyst, the soluble polymer content is 4.5% by weight and the bulk density is 0.36 grams per milliliter.

EXAMPLE XV

B. Polymerization

The polymerization is carried out as described in XIIIB, except that now the polymerization is carried out at 338° K. instead of 333° K.

The polymerization activity is 9860 grams of polypropylene per gram of titanium catalyst, the soluble polymer content is 3.9% by weight and the bulk density is 0.38 grams per milliliter.

EXAMPLE XVI

B. Polymerization

The polymerization is carried out as described in XIIIB, except that now the polymerization is carried out at 343° K. instead of 333° K.

The polymerization activity is 11530 grams of polypropylene per gram of titanium catalyst, the soluble polymer content is 4.0% by weight and the bulk density is 0.40 grams per milliliter.

EXAMPLE XVII

B. Polymerization

The polymerization is carried out as described in XIIIB, except that now the polymerization is carried out at 348° K. instead of 333° K.

The polymerization activity is 9625 grams of polypropylene per gram of titanium catalyst, the soluble polymer content is 3.5% by weight and the bulk density is 0.38 grams per milliliter.

EXAMPLE XVIII

A.2. Washing and Treatment of Ground Product To Form the Finished Catalyst Component About 1 gram of the ground product from IIA.1 is suspended in 30 ml of toluene. The suspension is stirred during 2 hours at 353° K. The suspension is then filtered and the solid matter washed with water-free gasoline.

The washed product is then suspended in 40 grams of $TiCl_4$. After the solid matter has been in contact with $TiCl_4$ for 2 hours at 353° K., he suspension is filtered and washed with gasoline at 333° K. till the filtrate is virtually free of $TiCl_4$. Finally, the finished titanium catalyst component thus obtained is dried.

B. Polymerization 2.3 liters of gasoline are supplied to a stainless steel reactor purged with nitrogen and provided with a mechanical stirrer. Separately, 2.00 mmoles of triethyl aluminum, 0.50 mmoles of diethyl aluminum chloride, 0.50 mmoles of methyl-p-toluate and 90 mgrams of the finished titanium catalyst component obtained according to XVIIIA.2 are fed to the reactor. Hydrogen and purified propylene are fed in to partial pressure of 40 and 610 kPa respectively. The temperature of the reactor is raised to 343° K. and maintained at that value. After a period of polymerization of 1 hour the polymer is isolated by centrifugation.

The polymerization activity is 7725 grams of polypropylene per gram of titanium catalyst, the soluble polymer content is 4.5% by weight and the bulk density is 0.33 grams per milliliter.

EXAMPLE XIX

B. Polymerization

The polymerization is carried out as described in XVIIIB, except that now the period of polymerization is two hours.

The polymerization activity is 11480 grams of polypropylene per gram of titanium catalyst, the soluble polymer content is 5.3% by weight and the bulk density is 0.34 grams per milliliter.

EXAMPLE XX

B. Polymerization 2.3 liters of gasoline are supplied to a stainless steel reactor purged with nitrogen and provided with a mechanical stirrer. Separately, 2.00 mmoles of triethyl aluminum, 0.50 mmoles of diethyl aluminum chloride, 0.50 mmoles of methyl-p-toluate and 90 mgrams of the finished titanium catalyst component obtained according to XVIII A.2 are fed to the reactor. Purified propylene is fed in to a partial pressure of 650 kPa.

The temperature of the reactor is raised to 343° K. and maintained at that value. After a period of polymerization of 2 hours the polymer is isolated by centrifugation.

The polymerization activity is 13090 grams of polypropylene per gram of titanium catalyst, the soluble polymer content is 3.4% by weight and the bulk density is 0.39 grams per milliliter.

EXAMPLE XXI

A.2. Washing and Treatment of Ground Product To Form the Finished Catalyst Component About 1 gram of the ground product from IIA.1 is suspended in 30 ml of a mixture of toluene and o-cresol, containing such a quantity of o-cresol that the suspension formed contains 10 molecules of o-cresol per atom of titanium. The suspension is stirred during 2 hours at 353° K. The suspension is then filtered and the solid matter washed with water-free gasoline.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization 2.3 liters of gasoline are supplied to a stainless steel reactor purged with nitrogen and provided with a mechanical stirrer. Separately, 2.00 mmoles of triethyl aluminum, 0.50 mmoles of diethyl aluminum chloride, 0.38 mmoles of methyl-p-toluate and 60 mgrams of the finished titanium catalyst component obtained according to XXIA.2 are fed to the reactor. 0.5 l of hydrogen is fed to the reactor and also purified propylene is fed in to a partial pressure of 200 kPa. Then the reaction mixture is subjected to a prepolymerization reaction during 10 minutes at 293° K. After that the temperature and the propene partial pressure are raised to 343° K. and 650 kPa. The hydrogen concentration in the reactor is maintained at 2%. After a period of polymerization of 2 hours the polymer is isolated by centrifugation.

The polymerization activity is 17730 grams of polypropylene per gram of titanium catalyst, the soluble polymer content is 3.8% by weight, the bulk density is 0.37 grams per milliliter, the $n_{RRS}$ is 1.5 and the $d_{50}$ is 600 μm.

EXAMPLE XXII

A.2. Washing and Treatment of Ground Product To Form the Finished Catalyst Component About 1 gram of the ground product from IIA.1 is suspended in 30 ml of a mixture of toluene and o-cresol, containing such a quantity of o-cresol that the suspension formed contains 1 molecule of o-cresol per atom of titanium. The suspension is stirred during 2 hours at 353° K. The suspension is then filtered and the solid matter washed with water-free gasoline.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization

The polymerization is carried out as described in XXIB, except that now 0.62 mmoles instead of 0.38 mmoles of methyl-p-toluate and 60 mgrams of the finished titanium catalyst obtained according to XXIIA.2 are used.

The polymerization activity is 8420 grams of polypropylene per gram of titanium catalyst, the soluble polymer content is 2.3% by weight and the bulk density is 0.36 grams per milliliter.

EXAMPLE XXIII

A.2. Washing and Treatment of Ground Product To Form the Finished Catalyst Component About 1 gram of the ground product from IIA.1 is suspended in 30 ml of a mixture of toluene and o-cresol, containing such a quantity of o-cresol that the suspension formed contains 10 molecules of o-cresol per atom of titanium. The suspension is stirred during 2 hours at 353° K. The suspension is then filtered and the solid matter washed with water-free gasoline.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization

The polymerization is carried out as described in XXIIB, except that now 60 mgrams of the finished titanium catalyst obtained according to XXIIIA.2 are used.

The polymerization activity is 6220 grams of polypropylene per gram of titanium catalyst, the soluble polymer content is 1.0% by weight and the bulk density is 0.36 grams per milliliter.

EXAMPLE XXIV

A.2. Washing and Treatment of Ground Product To Form the Finished Catalyst Component About 1 gram of the ground product from IIA.1 is suspended in 30 ml of a mixture of toluene and o-cresol, containing such a quantity of o-cresol that the suspension formed contains 0.1 molecules of o-cresol per atom of titanium. The suspension is stirred during 2 hours at 353° K. The suspension is then filtered and the solid matter washed with water-free gasoline.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization

The polymerization is carried out as described in XXIIB, except that now 60 mgrams of the finished titanium catalyst obtained according to XXIVA.2 are used.

The polymerization activity is 7000 grams of polypropylene per gram of titanium catalyst, the soluble polymer content is 2.3% by weight and the bulk density is 0.39 grams per milliliter.

EXAMPLE XXV

B. Polymerization 2.3 liters of gasoline are supplied to a stainless steel reactor purged with nitrogen and provided with a mechanical stirrer. Separately, 2.0 mmoles of triethyl aluminum, 0.5 mmoles of diethyl aluminum chloride, 0.5 mmoles of methyl-p-toluate and 90 mgrams of the finished titanium catalyst component obtained according to XXIA.2 are fed to the reactor. Hydrogen and purified propylene are fed in to partial pressure of 20 and 630 kPa respectively. The temperature of the reactor is raised to 343° K. and maintained at that value. After a period of polymerization of 2 hours the polymer is isolated by centrifugation.

The polymerization activity is 11560 grams of polypropylene per gram of titanium catalyst, the soluble polymer content is 2.5% by weight and the bulk density is 0.42 grams per milliliter.

EXAMPLE XXVI

B. Polymerization

The polymerization is carried out as described in XXVB, except that now 0.42 mmoles instead of 0.50 mmoles of methy-p-toluate are used.

The polymerization activity is 15820 grams of polypropylene per gram of titanium catalyst, the soluble polymer content is 3.0% by weight and the bulk density is 0.41 grams per milliliter.

EXAMPLE XXVII

B. Polymerization

The polymerization is carried out as described in XXVB, except that now 0.36 mmoles instead of 0.50 mmoles of methyl-p-toluate are used.

The polymerization activity is 17920 grams of polypropylene per gram of titanium catalyst, the soluble polymer content is 4.6% by weight and the bulk density is 0.41 grams per milliliter.

COMPARATIVE EXPERIMENT A

B. Polymerization

The polymerization is carried out in the same way as described in example I, but this time 0.2 grams of the solid as obtained in IA.1 is used as catalyst. The polymerization activity is now 4950 grams of polypropylene per gram of (unfinished) titanium catalyst, the soluble-polymer content is 5.6% by weight and the bulk density is 0.34 grams per milliliter.

COMPARATIVE EXPERIMENT B

A.2. Washing and Treatment of Ground Product To Form the Finished Catalyst Component About 1 gram of the ground product from IIA.1 is suspended in 30 ml of a mixture of toluene and o-cresol, containing such a quantity of o-cresol that the suspension formed contains 100 molecules of o-cresol per atom of titanium. The suspension is stirred during 2 hours at 353° K. The suspension is then filtered and the solid matter washed with water-free gasoline.

The washed product is then suspended in 40 grams of $TiCl_4$. After the solid matter has been in contact with $TiCl_4$ for 2 hours at 353° K., the suspension is filtered and washed with gasoline at 333° K. Finally, the finished titanium catalyst component thus obtained is dried.

B. Polymerization

The polymerization is carried out as described in XXIIB, except that now 60 mgrams of the finished titanium catalyst obtained according to A.2 of this Comparative Experiment B.

The polymerization activity is 4500 grams of polypropylene per gram of titanium catalyst, the soluble polymer content is 28.3% by weight and the bulk density is 0.31 grams per milliliter.

What is claimed is:

1. A process for preparing a solid titanium-containing catalyst component useful for homo-polymerizing 1-alkenes and for co-polymerizing 1-alkenes with each other and/or with ethylene comprising:
    A. forming a complex by contacting a titanium halide compound with an electron donor compound;
    B. forming a magnesium aluminum halide by precipitation from an organic solvent;
    C. forming a ground product by grinding said complex with said magnesium aluminum halide;
    D. washing said ground product with a washing liquid containing a solvent which removes aluminium halide and electron donor; and
    E. contacting said washed product with a liquid titanium halide compound to form a finished titanium catalyst component.

2. The process of claim 1, wherein said washing step D is effected with one or a mixture of aliphatic, cycloaliphatic or aromatic hydrocarbons having 4–12 carbon atoms per molecule.

3. The process, of claim 1, wherein said step D is effected with a washing liquid containing in addition to said solvent at least one aromatic alcohol, the molar ratio between alcohol and titanium in the ground product ranging between about 50:1 and 1:20.

4. The process of claim 1, wherein said step D is effected with between about 1 and about 1000 grams of said washing liquid per gram of said ground product.

5. The process of claim 4, wherein said step D is effected with between about 5 and about 100 grams of said washing liquid per gram of said ground product.

6. The process of claim 5, wherein said step D is carried out at a temperature of between about 250° and about 450° K.

7. The process of claim 6, wherein said temperature is between about 330° and about 420° K.

8. The process of claim 3, wherein the solvent:alcohol weight ratio of said washing liquid is between about 2:1 and 2000:1.

9. The process of claim 3, wherein the solvent:alcohol weight ratio of said washing liquid is between about 5:1 and 200:1.

10. The process of claim 3, wherein said alcohol is an unsubstituted phenol or a phenol substituted with one or more halogen groups and/or with one or more alkyl and/or alkoxy groups.

11. The process of claim 3, wherein said alcohol is chosen from the group consisting of the cresols, the methoxy phenols, the xylenols, the ethyl phenols, the propyl phenols, the octyl phenols, the dibutyl phenols, the cumyl phenols and the naphthols.

12. The process of claim 3, wherein said alcohol is o-cresol.

13. The process of claim 1, wherein said titanium halide compound with which said washed product is contacted is $TiCl_4$.

14. The process of claim 1, wherein said washed product is contacted with an amount of liquid titanium halide compound, expressed as the number of mmoles of Ti per gram of said washed ground product, between about 1 and about 1000 mmoles/gram.

15. The process of claim 14 wherein said amount is between about 5 and about 500 mmoles/gram.

16. The process of claim 1, wherein said magnesium aluminum halide is formed by the process comprising:
    A. forming a solution of an organic aluminum compound and an organic magnesium compound; and
    B. contacting said solution with a halogenating agent of the formula $RX_m$ wherein R is a hydrocarbon group, a hydrogen atom, or a halogen atom, X is a halogen atom, and m is an integer from 1 to 10.

17. The process of claim 1, wherein the magnesium:aluminum weight ratio of said magnesium aluminum halide is between about 1:3 and 100:1.

18. The process of claim 17, wherein said ratio is between about 1:1 20:1.

19. The process of claim 1, wherein the titanium:magnesium:aluminum weight ratio of said ground product is 1:(0.5–20):(0.1–5).

20. The process of claim 19, wherein said ratio is 1:(0.5–2.5):(0.2–1).

21. The process of claim 1, wherein:
    said step D is effected with between about 5 and about 100 grams of said washing liquid per gram of said ground product;
    said step D is carried out at a temperature between about 330° and 420° K.;
    said washed product is contacted with an amount of liquid titanium halide compound, expressed as the number of mmoles of Ti per gram of said washed product, between about 5 and about 500 mmoles/gram;
    the magnesium:aluminum weight ratio of said magnesium aluminum halide is between about 1:1 and about 20:1; and the titanium:magnesium:aluminum weight ratio of said ground product is 1:(0.5–2.5):(0.2–1).

22. The process of claim 3, wherein:
    said step D is effected with between about 5 and about 100 grams of said washing liquid per gram of said ground product;

said step D is carried out at a temperature between about 330° and 420° K.;

the solvent:alcohol weight ratio of said washing liquid is between about 5:1 and 200:1;

said washed product is contacted with an amount of liquid titanium halide compound, expressed as the number of mmoles of Ti per gram of said washed product, between about 5 and about 500 mmoles/gram;

the magnesium:aluminum weight ratio of said magnesium aluminum halide is between about 1:1 and about 20:1; and the titanium:magnesium:aluminum weight ratio of said ground product is 1:(0.5–2.5):(0.2–1).

23. A catalyst produced by the process including the steps of:

i forming a complex by contacting a titanium halide compound with an electron donor compound;

ii forming a magnesium aluminum halide by precipitation from an organic solvent;

iii forming a ground product by grinding said complex with said magnesium aluminum halide;

iv washing said ground product with a washing liquid containing a solvent which removes aluminum halide and electron donor; and v contacting said washed product with a liquid titanium halide compound to form a finished titanium catalyst component.

24. The catalyst of claim 23, in the production of which a washing liquid is used, that, in addition to the said solvent, contains at least one aromatic alcohol, the molar ratio between alcohol and titanium in the ground product ranging between 50:1 and 1:20.

25. The catalyst of claim 23 at least consisting of 1–10 percent by weight of titanium, 16–25 percent by weight of magnesium, 0.05–2.0 percent by weight of aluminum, 45–65 percent by weight of halogen and 5–25 percent by weight of electron donor.

* * * * *

UNITED STATES PATENT AND TRADEMARK OFFICE
CERTIFICATE OF CORRECTION

PATENT NO. : 4,546,092
DATED : October 8, 1985
INVENTOR(S) : LOONTJENS, Jacobus A. and MUSKENS, Bernardus J.

It is certified that error appears in the above—identified patent and that said Letters Patent is hereby corrected as shown below:

Claim 18, line 2, insert --and-- between "1:1" and "20:1".

Signed and Sealed this

Twenty-fourth Day of June 1986

[SEAL]

Attest:

Attesting Officer

DONALD J. QUIGG

Commissioner of Patents and Trademarks